Figure 2:
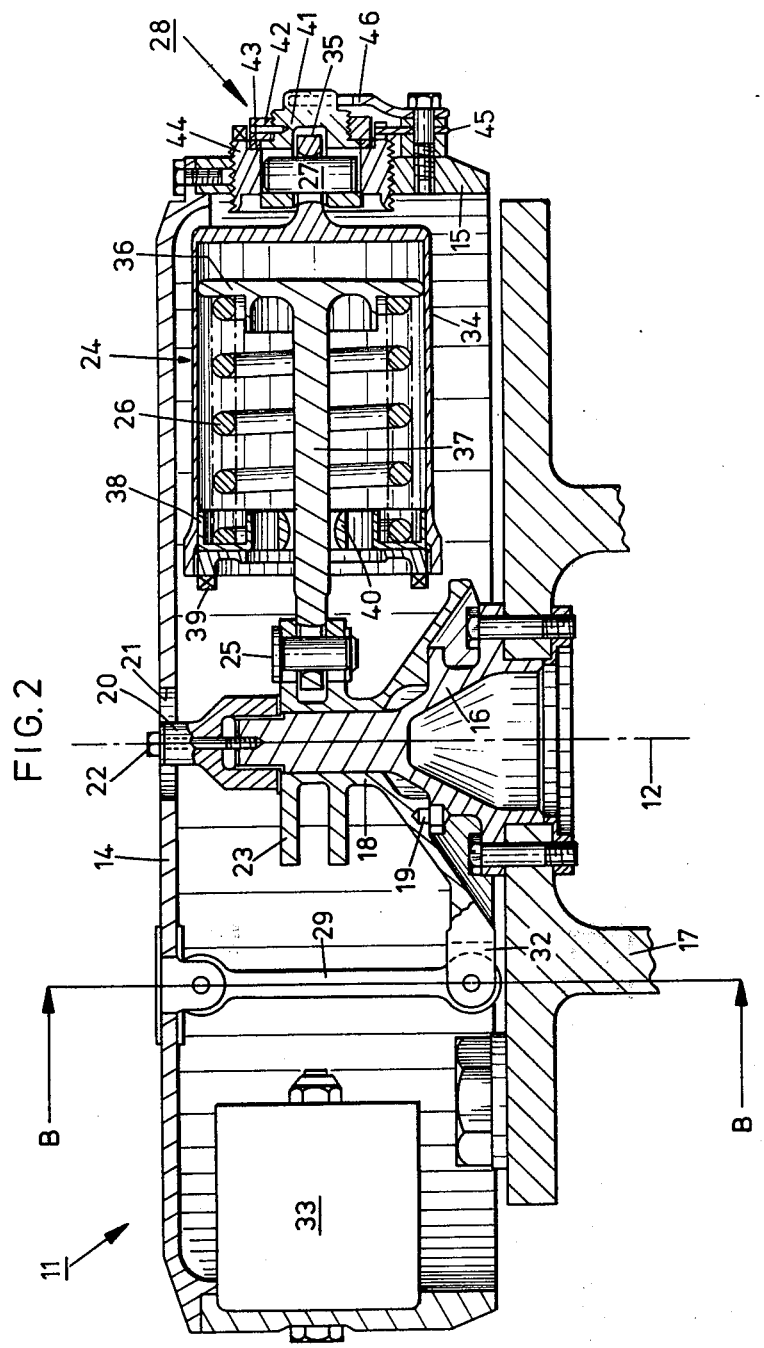

United States Patent [19]
Vincent et al.

[11] 3,910,720
[45] Oct. 7, 1975

[54] VIBRATION ABSORBING MEANS

[75] Inventors: Alan Henry Vincent; Peter John Flux, both of Yeovil, England

[73] Assignee: Westland Aircraft Limited, Yeovil, England

[22] Filed: Apr. 8, 1974

[21] Appl. No.: 459,078

[30] Foreign Application Priority Data
Apr. 26, 1973 United Kingdom............... 19997/73

[52] U.S. Cl................................. 416/145; 416/500
[51] Int. Cl.²......................................... B64C 27/32
[58] Field of Search........ 416/500, 145, 144; 74/573

[56] References Cited
UNITED STATES PATENTS

| | | | |
|---|---|---|---|
| 2,186,199 | 1/1970 | Martin................................ | 416/145 |
| 2,440,956 | 5/1948 | Kearns et al........................ | 416/500 X |
| 2,464,773 | 3/1949 | Kearns............................... | 416/500 X |
| 2,495,565 | 1/1950 | Baker................................. | 416/500 X |
| 2,576,105 | 11/1951 | Childs................................ | 416/145 X |
| 2,594,555 | 4/1952 | Hardy................................ | 74/574 |
| 2,722,848 | 11/1955 | Stein.................................. | 416/144 X |
| 3,219,120 | 11/1965 | Hooper.............................. | 416/145 |
| 3,298,443 | 1/1967 | Burkam et al. ................... | 416/145 X |
| 3,362,251 | 1/1968 | Francis.............................. | 416/145 |

FOREIGN PATENTS OR APPLICATIONS
121,370   10/1958   U.S.S.R.............................. 416/500

*Primary Examiner*—Everette A. Powell, Jr.
*Attorney, Agent, or Firm*—Larson, Taylor & Hinds

[57] ABSTRACT

This invention relates to a vibration absorbing means which, in the embodiment described, is particularly suitable for use on a rotor system of a rotary wing aircraft. The absorbing means includes a mass in the form of a circular weight resiliently mounted around the axis of rotation for rotation with the rotor, the mounting being arranged so as to permit oscillation of the weight during rotation, and to restrain such oscillation to be in any direction within a plane substantially perpendicular to the axis of rotation. The arrangement enables the absorbing means of the invention to be tuned to either cancel or substantially reduce both the ($n-1$) and ($n+1$) frequency vibrations in a single installation.

15 Claims, 3 Drawing Figures

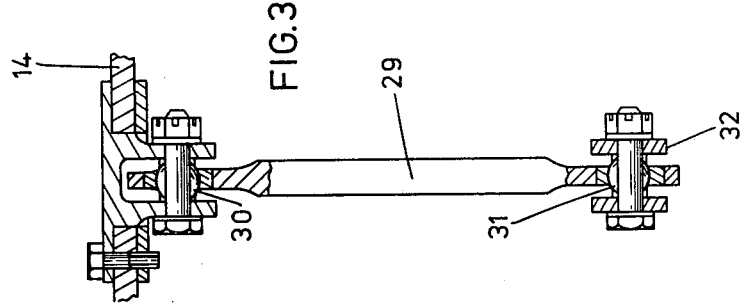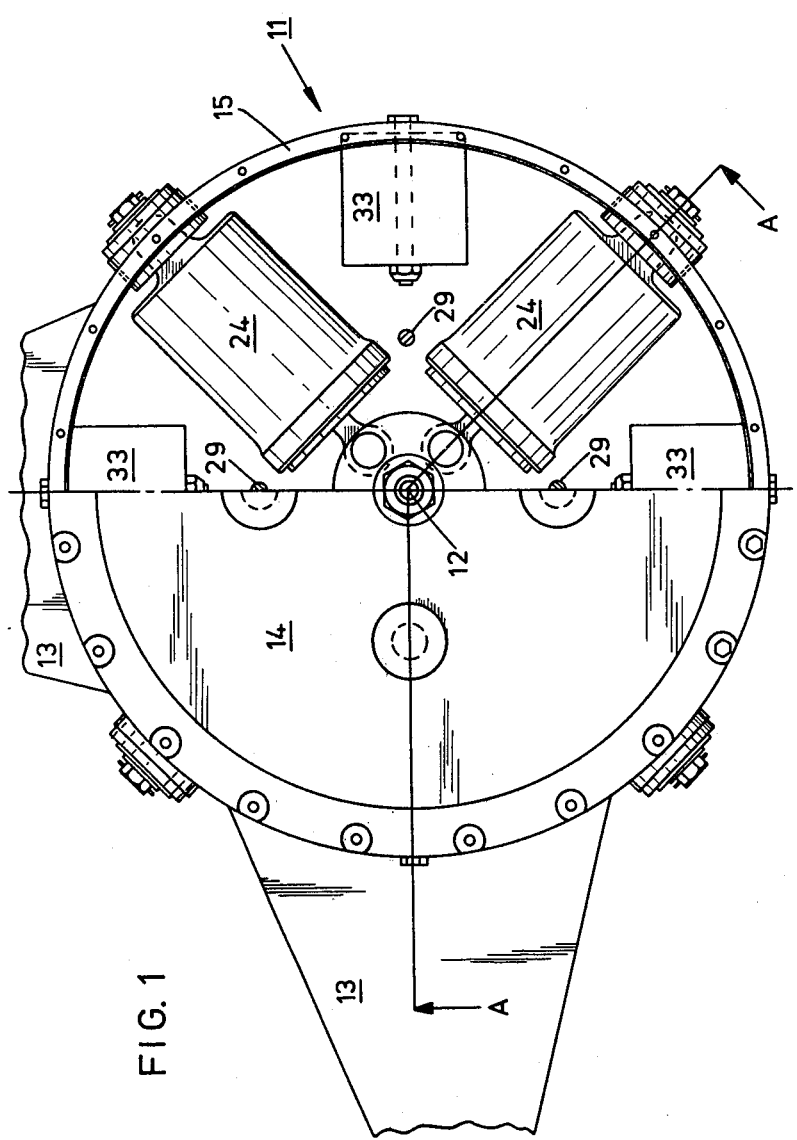

VIBRATION ABSORBING MEANS

THIS INVENTION relates to vibration absorbing means.

In a particular embodiment of the invention hereinafter described, a vibration absorbing means according to the invention is adapted for cancelling or substantially reducing in-plane (or horizontal) vibration forces active on a rotor head of a rotary wing aircraft.

The troublesome in-plane vibration forces comprise $(n-1)$ frequency vibrations and $(n+1)$ frequency vibrations. By $(n-1)$ vibrations we mean the vibrations which oscillate at a frequency equal to the number of blades $(n)$ minus one times rotor r.p.m., i.e. $(n-1) \times$ rotor r.p.m., and by $(n+1)$ vibrations we mean the vibrations which oscillate at a frequency equal to the number of blades $(n)$ plus one times rotor r.p.m., i.e. $(n+1) \times$ rotor r.p.m. Taking a four-bladed rotor as an example, these vibrations are also sometimes referred to as 3R and 5R vibrations.

A prior arrangement for reducing these in-plane vibration forces consists of a bifilar vibration damper assembly as disclosed in British Pat. No. 1,264,637. One of the disadvantages of such an arrangement is that a single bifilar assembly must consist of at least three bifiliar dampers and can only be tuned to cancel either the $(n-1)$ or $(n+1)$ vibrations. It follows, therefore, that to cancel both the $(n-1)$ and the $(n+1)$ vibrations, at least six bifilar dampers are necessary, three of which are tuned to the $(n-1)$ vibrations and the remaining three are tuned to the $(n+1)$ vibrations. This obviously results in an increase in mechanical complexity, weight and maintenance procedures, and has an adverse effect on performance because of increased drag.

A further disadvantage of a bifilar assembly results from the centre of gravity of the bifilar dampers being restrained to rotate in a circular path concentric with the axis of rotation of the rotor. This means that, whether tuned to either $(n-1)$ or $(n+1)$ vibrations, the assembly is capable only of cancelling force vectors of one particular phase and magnitude (i.e. is capable only of cancelling a force which is itself circular), and can, in some instances, actually induce an out-of-balance force at the rotor head.

In accordance with the invention, we provide a rotary wing aircraft having a main rotor system including a rotor hub mounted for rotation about a generally vertical axis and a plurality of rotor blades extending radially from the rotor hub, a vibration absorbing means mounted on the rotor hub, the vibration absorbing means comprising, in combination, a circular weight disposed around the axis of rotation for rotation with the rotor hub in a plane substantially perpendicular to the axis of rotation, the said weight being supported by resilient support means comprising at least three resilient supports arranged symmetrically about the axis of rotation and extending radially outwardly from inner attachments adjacent the axis of rotation to outer attachments on the weight so that, during rotation, the weight is capable of oscillation in any direction within its plane of rotation, and further support means for restraining the oscillatory movements of the weight to be within the plane substantially perpendicular to the axis of rotation.

According to another aspect of the invention we provide a rotary wing aircraft having a main rotor system including a rotor hub mounted for rotation about a generally vertical axis and a plurality of rotor blades extending radially from the hub, a vibration absorbing means mounted on the rotor hub, the absorbing means including a circular weight disposed around the axis of rotation and supported by resilient support means for rotation with the rotor hub in a plane substantially perpendicular to the axis of rotation, the resilient support means including a plurality of resilient supports extending radially between inner attachments adjacent the rotational axis and outer attachments on the weight so that, during rotation, the weight is capable of oscillation in any direction within its plane of rotation, and a movable parallelogram support structure connected to the weight so that its oscillatory movements during rotation are restrained to be within a plane substantially perpendicular to the axis of rotation.

The invention will now be described by way of example only and with reference to the accompanying drawings, in which:

FIG. 1 is a part sectioned plan view of a vibration absorbing means mounted at the top of a rotor of a rotary wing aircraft, FIG. 2 is a sectioned view taken on lines A—A of FIG. 1, and FIG. 3 is a part sectioned view of a detail part taken on lines B—B of FIG. 2.

Referring now to FIG. 1, a mass in the form of a circular weight 11 is mounted at the top of a rotor hub so that when stationary the weight is located concentrically of a rotational axis 12. In the embodiment shown the rotor has four rotor blades (not shown) attached to the outboard ends of four generally radially extending arms 13, two only being shown in FIG. 1.

From FIG. 2 it can be seen that the weight 11 is of inverted 'U' shape in transverse section, and is fabricated from an upper circular plate 14 bolted around its edge to a ring member 15.

The weight 11 is supported by four resilient support means comprising spring boxes 24 equispaced around the rotational axis 12 and extending radially between inner attachments provided adjacent the rotational axis 12 and outer attachments provided in the ring member 15.

Referring now to FIG. 2, a spindle 16 is bolted through a flange portion to extend upwardly from a rotor hub 17 coincidental with the axis of rotation 12. A support 18 is located over the spindle 16 and is locked against relative rotational movement by a pin 19. The support is retained by a nut 20 having a closed end and screwed onto the upper end of the spindle 16, the nut being accessible through a central hole 21 in the plate 14. The nut 20 is locked by a bolt 22 extending downwardly through the nut 20 and threaded into the top of the spindle 16. The nut 20 and bolt 22 have opposite handed threads to ensure effective locking during rotation.

A radially extending flange portion 23 on the support 18 provides the inner attachment means for each of the four equispaced radially extending spring boxes 24. Each spring box 24 comprises a housing 34 having a closed outer end provided with a centrally extending flange 35 providing the outer attachment for each of the spring boxes 24. A piston 36 is located in the bore of the housing 34 and has a centrally extending rod 37 protruding through an open inner end of the housing 34 for attachment to the flange 23 by pins 25 located through holes in the flanges 23 and rods 37 and retained by circlips (not shown). A pre-loaded compression spring 26 is retained in the housing 34 by a spring seat 38 and castellated retaining nut 39 screwed into the open inner end of the housing 34. The spring acts to normally urge the piston 36 towards the closed end of the housing 34 although it is important that in a position of rest the piston 36 is located in an intermediate position, as shown in the drawing. The spring seat 38 has an inwardly extending portion having a radiussed inner aperture 40 which is a clearance fit around the rod 37.

The outer attachment of each spring box 24 comprises a spring adjusting mechanism generally indicated at 28 located in the ring 15. The flange 35 is retained in a forked sleeve 41 by a pin 27 located in a hole in the sleeve 41. A thrust nut 42 is screwed onto a threaded portion of the sleeve 41 and is retained by a grub screw, the thrust nut 42 retaining a thrust washer 43 in contact with an outer surface of a castellated adjusting screw 44 screwed into a threaded hole in the ring 15.

Locking means are provided at each location of the adjusting mechanism 28, and includes a locking block 45 and formed lock plate 46 retained by spacers and two bolts screwed into the outer surface of the ring 15. The block 45 extends upwardly to locate between castellations on the adjusting screw 44, and the forked lock plate 46 extends upwardly to locate an opposed flats on a hexagon section formed on the sleeve 41.

The mounting holes for the pins 25 and 27 at the inner and outer attachments are oversized, and the surfaces of the supporting holes at the end of the rod 37 and in the flange 35 are radiussed to provide important operational features, as will hereinafter be explained.

Four rods 29 extend downwardly from ball joints 30 (FIG. 3) mounted in the plate 14 and are located symmetrically of the rotational axis 12 intermediate the spring boxes 24, the lower ends of the rods 29 being connected through ball joints 31 (FIG. 3) to flanged ends 32 of four arms extending radially from the support 18. The four rods 29 are, therefore, mounted at their ends in universal joints and form a movable parallelogram support structure for the weight 11.

Adjustable or removable weights 33 are bolted to the inner surface of the ring 15 and are located symmetrically of the rotational axis 12 and intermediate the location of the four spring adjusting mechanisms 28.

From the foregoing it will be apparent that the present invention provides a vibration absorbing means comprising a rotating mass in the form of a single weight 11 which is resiliently supported to be capable, during rotation, of oscillating movement in any direction relative the axis of rotation 12 of the rotor hub 17. The rods 29 ensure that the plane of rotation of the weight 11 throughout any such oscillatory movement is always substantially perpendicular to the axis of rotation 12, although it will of course be understood that any such oscillatory movements will cause some vertical movement of the weight 11, due to the action of the rods 29. The oversize holes and radiussed surfaces in the spring box attachment means ensures that oscillatory movements are accommodated by rolling motion about the pins 25 and 27, thereby substantially eliminating undesirable frictional forces. Operational chatter of the open end of each housing 34 is prevented by the radiussed inner aperture 40 of the seat 38 being located around the rod 37.

The vibration absorbing means according to the invention is tuned in the non-rotating condition to a frequency equal to $n$ X rotor r.p.m. (4R for a four-bladed rotor) at normal operating speed, so that in the rotating condition at normal operating speed it will respond at both $(n-1)$ and $(n+1)$ frequency vibrations (3R and 5R for a four-bladed rotor), thus producing the required longitudinal and lateral fixed direction components of the correct relative magnitude and phase in a single installation. Furthermore, unequal force vectors can be effectively cancelled with no possibility of inducing an out-of-balance force at the rotor head, as is the case in the bifilar installations. Thus both of the operational disadvantages of the aforementioned bifilar installations are effectively overcome by the vibration absorbing means of the present invention.

Tuning of the absorbing means of the present invention is readily accomplished by varying the mass of the weight 11 which is facilitated by the weights 33, and/or by adjusting the pre-load on the springs 26. Adjustment of the spring pre-load is accomplished by releasing the lock plate 46 and the locking block 45 to facilitate rotation of the castellated adjusting screw 44 followed by replacement of the locking means. In this respect, the invention discloses an advantageous arrangement in which the spring adjusting means 28 are located externally to facilitate in situ adjustment.

The shape and location of the mass in the form of the weight 11 is more compatible with the aerodynamic shape of a rotor head than is a bifilar installation, thereby representing an improvement in drag characteristics.

Maintenance procedures on the present invention are minimised by the fact that a single installation only is necessary, and are further reduced because of the arrangement in which the operative parts are virtually wholly encased by the inverted 'U' shaped weight 11, thereby affording protection against damage by dust, rain, etc. The mounting arrangement disclosed herein is another important feature in this respect, in that the complete assembly can be withdrawn from the spindle 16 by removing only the bolt 22 and the nut 20.

The arrangement of the present invention is not limited to use with a four-bladed rotor, and can be used effectively to simultaneously cancel in-plane vibration forces of both $(n-1)$ and $(n+1)$ frequencies in rotor systems having any number of blades.

Although one embodiment of the invention has been described and illustrated it is to be understood that modifications can be made without departing from the scope of the invention. For instance, the weight 11 could be in the form of an inverted dome, and/or be provided with radiussed edges, to further improve the drag characteristics. Other than four pre-loaded springs 26 can be utilised, although in this respect a minimum of three is necessary to ensure symmetry. The spring boxes 24 as shown in the drawings are a convenient way of housing and installing the pre-loaded springs 26; however, other arrangements could be incorporated to facilitate design modifications. The spindle 16 could form an integral part of the rotor hub 17, and could be provided with an upward extension to protrude through a modified nut 20 to facilitate locking by a split pin, thereby dispensing with the bolt 22. To ease manufacture the piston 36 and rod 37 could be manufactured separately and bolted together on assembly.

We claim as our invention:

1. A rotary wing aircraft having a main rotor system including a rotor hub mounted for rotation about a generally vertical axis and a plurality of rotor blades extending radially from the rotor hub, a vibration absorbing means mounted on the rotor hub, said vibration absorbing means comprising, in combination, a circular weight disposed around the axis of rotation for rotation with the rotor hub in a plane substantially perpendicular to the axis of rotation, the said weight being supported by resilient support means comprising at least three resilient supports arranged symmetrically about the axis of rotation and extending radially outwardly from inner attachments adjacent the axis of rotation to outer attachments on the weight so that, during rotation, the weight is capable of oscillation in any direction within its plane of rotation, and further support means for restraining the said oscillatory movements of the weight to be within the plane substantially perpendicular to the axis of rotation.

2. A rotary wing aircraft as claimed in claim 1, wherein the circular weight is of inverted 'U' shape in transverse cross-section and comprises an upper circular plate secured around its edge to a ring member.

3. A rotary wing aircraft as claimed in claim 1 wherein the inner attachments are through a radially extending flange portion formed on a support retained around a spindle extending upwardly from the rotor hub and coincident with the axis of rotation of the rotor hub.

4. A rotary wing aircraft as claimed in claim 3, wherein said support is locked to the spindle for rotation therewith and is retained by a locked nut.

5. A rotary wing aircraft as claimed in claim 4, wherein each resilient support means includes a housing having an open inner end and a closed outer end, the closed outer end having an extending flange for the outer attachments, a piston located in the bore of the housing having a centrally extending rod protruding through the open inner end of the housing for the inner attachments, and a pre-loaded compression spring located in the housing to normally urge the piston towards the closed end of the housing, the spring being retained by a spring seat and a castellated retaining nut screwed into the open inner end of the housing.

6. A rotary wing aircraft as claimed in claim 5, wherein the spring seat has an inwardly extending portion having a radiussed aperture located around the protruding rod on the piston.

7. A rotary wing aircraft as claimed in claim 5, wherein the inner attachment of each resilient support means is by a pin located through a hole formed in said flange portion on said support and in the inner end of the rod from the piston, and the outer attachment means is by a pin located in a hole formed in the flange on the closed end of the housing and retained in a hole formed in a spring adjusting means.

8. A rotary wing aircraft as claimed in claim 7, wherein the holes formed for the pins at the inner and outer attachments are of larger diameter than the pins, and the holes formed in the end of the rod on the piston and in the flange on the closed end of the housing have radiussed surfaces.

9. A rotary wing aircraft as claimed in claim 7, wherein the spring adjusting means comprises a forked sleeve located over the flange at the outer end of the housing and provided with the hole formed for retention of the pin, and a thrust nut screwed onto a threaded portion of the sleeve to retain a thrust washer in contact with an outer surface of a castellated adjusting screw threaded into the mass.

10. A rotary wing aircraft as claimed in claim 4, wherein the further support means comprises a movable parallelogram support structure.

11. A rotary wing aircraft as claimed in claim 10, wherein the parallelogram support structure comprises four downwardly extending rods located symmetrically of the rotational axis, each rod being connected between a universal joint on a circular plate portion of the weight and a universal joint located at the flanged end of an arm extending radially from the support.

12. A rotary wing aircraft as claimed in claim 1 wherein the said vibration absorbing means is tuned to absorb both $(n-1)$ times rotor rpm and $(n+1)$ times rotor rpm frequency vibrations effective on the rotor during rotation, n being equal to the number of rotor blades.

13. A rotary wing aircraft having a main rotor system including a rotor hub mounted for rotation about a generally vertical axis and a plurality of rotor blades extending radially from the rotor hub, a vibration absorbing means mounted on the rotor hub, the absorbing means including a circular weight disposed around the axis of rotation and supported by resilient support means for rotation with the rotor hub in a plane substantially perpendicular to the axis of rotation, the resilient support means including a plurality of resilient supports extending radially between inner attachments adjacent the rotational axis and outer attachments on the weight so that, during rotation, the weight is capable of oscillation in any direction within its plane of rotation, and a movable parallelogram support structure connected to the weight so that its oscillatory movements during rotation are restrained to be within a plane substantially perpendicular to the axis of rotation.

14. A rotary wing aircraft as claimed in claim 13, wherein the vibration absorbing means is tuned to absorb rotor in-plane vibrations occurring at both $(n-1)$ and $(n+1)$ frequencies.

15. A rotary wing aircraft having a main rotor system including a rotor hub mounted for rotation about a generally vertical axis and a plurality of rotor blades extending radially from the rotor hub, a vibration absorbing means mounted on the rotor hub and comprising in combination, a circular weight of inverted U-shape in transverse cross-section having an upper circular plate portion and a ring member portion, the said weight being disposed around the axis of rotation for rotation with the rotor hub in a plane substantially perpendicular to the axis of rotation, at least three resilient spring box support means arranged symmetrically about the axis of rotation and extending radially outwardly from inner attachments adjacent the axis of rotation to outer attachments in the ring member portion to support the weight so that, during rotation, the said weight is capable of oscillation in any direction within its plane of rotation, the said inner attachments each comprising a pinned connection through a radially extending flange formed on a support rotationally fixed to the rotor hub to extend upwardly therefrom and arranged coincidental with the axis of rotation of the hub, the said outer attachments each comprising a pinned connection through a spring adjusting means located in the ring member portion, and a movable parallelogram support structure comprising four downwardly extending rods located symmetrically of the rotational axis, each rod being connected through a universal joint in the circular plate portion of the weight and a universal joint located at the end of an arm extending radially from the support rotationally fixed to the hub.

* * * * *